(12) United States Patent
Ziegenspeck et al.

(10) Patent No.: US 10,567,705 B2
(45) Date of Patent: Feb. 18, 2020

(54) COAXIAL CABLE WITH BIDIRECTIONAL DATA TRANSMISSION

(71) Applicant: MAGNA ELECTRONICS INC., Auburn Hills, MI (US)

(72) Inventors: Sven Ziegenspeck, Bad Neuenahr-Ahrweiler (DE); Pirmin Bader, Haibach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 645 days.

(21) Appl. No.: 14/297,663

(22) Filed: Jun. 6, 2014

(65) Prior Publication Data

US 2014/0362209 A1    Dec. 11, 2014

Related U.S. Application Data

(60) Provisional application No. 61/864,837, filed on Aug. 12, 2013, provisional application No. 61/833,080, filed on Jun. 10, 2013.

(51) Int. Cl.
*H04N 7/10* (2006.01)
*H04N 7/18* (2006.01)

(52) U.S. Cl.
CPC .............. *H04N 7/10* (2013.01); *H04N 7/183* (2013.01)

(58) Field of Classification Search
CPC .................................. H04N 7/10; H04N 7/183
USPC ........................................... 375/113; 348/113
See application file for complete search history.

(56) References Cited

U.S. PATENT DOCUMENTS

| 4,443,769 | A | * | 4/1984 | Aschwanden | ............ H03L 7/12 |
| | | | | | 329/356 |
| 4,485,398 | A | * | 11/1984 | Chapin, Jr. | ............ H04N 5/232 |
| | | | | | 348/333.01 |
| 4,987,357 | A | | 1/1991 | Masaki | |
| 4,991,054 | A | | 2/1991 | Walters | |
| 5,001,558 | A | | 3/1991 | Burley et al. | |
| 5,003,288 | A | | 3/1991 | Wilhelm | |
| 5,012,082 | A | | 4/1991 | Watanabe | |
| 5,016,977 | A | | 5/1991 | Baude et al. | |
| 5,027,001 | A | | 6/1991 | Torbert | |
| 5,027,200 | A | | 6/1991 | Petrossian et al. | |
| 5,044,706 | A | | 9/1991 | Chen | |
| 5,055,668 | A | | 10/1991 | French | |

(Continued)

FOREIGN PATENT DOCUMENTS

WO    WO2010144900    12/2010
WO    WO2011028686    3/2011

(Continued)

*Primary Examiner* — William C Vaughn, Jr.
*Assistant Examiner* — Jae N Noh
(74) *Attorney, Agent, or Firm* — Honigman LLP

(57) ABSTRACT

A vision system for a vehicle includes a camera and a control. The camera is disposed at a vehicle and has a field of view exterior of the vehicle. The camera is operable to capture image data. The control includes an image processor. A single coaxial cable connects the camera with the control. The single coaxial cable carries (i) image data from the camera to the control, (ii) control data from the control to the camera and (iii) electrical voltage for powering the camera. The image processor is operable to process image data captured by the camera and carried to the control by the single coaxial cable. The single coaxial cable carries at least one FBAS signal.

18 Claims, 13 Drawing Sheets

(56) References Cited

U.S. PATENT DOCUMENTS

| | | |
|---|---|---|
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A * | 9/2000 | Baker ............... H04N 5/23203 348/143 |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos et al. |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |

(56) References Cited

U.S. PATENT DOCUMENTS

| | | |
|---|---|---|
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,849,495 B2 | 9/2014 | Chundrlik, Jr. et al. |
| 8,908,039 B2 * | 12/2014 | De Wind ............... H04N 7/18 348/148 |
| 9,126,525 B2 | 9/2015 | Lynam et al. |
| 2002/0015153 A1 | 2/2002 | Downs |
| 2002/0037054 A1 * | 3/2002 | Schurig ............... H04B 3/542 375/257 |
| 2002/0113873 A1 | 8/2002 | Williams |
| 2002/0167589 A1 | 11/2002 | Schofield et al. |
| 2003/0103141 A1 | 6/2003 | Bechtel et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0200467 A1 | 9/2005 | Au et al. |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0250501 A1 | 11/2006 | Wildmann et al. |
| 2006/0254805 A1 | 11/2006 | Scherer et al. |
| 2006/0290479 A1 | 12/2006 | Akatsuka et al. |
| 2007/0104476 A1 | 5/2007 | Yasutomi et al. |
| 2007/0206835 A1 | 9/2007 | Abe |
| 2007/0297784 A1 | 12/2007 | Wong et al. |
| 2008/0042812 A1 | 2/2008 | Dunsmoir et al. |
| 2009/0093938 A1 | 4/2009 | Isaji et al. |
| 2009/0113509 A1 | 4/2009 | Tseng et al. |
| 2009/0174765 A1 | 7/2009 | Namba et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0002081 A1 | 1/2010 | Pawlicki et al. |
| 2010/0020170 A1 | 1/2010 | Higgins-Luthman et al. |
| 2010/0045799 A1 | 2/2010 | Lei et al. |
| 2010/0076621 A1 | 3/2010 | Kubotani et al. |
| 2010/0228437 A1 | 9/2010 | Hanzawa et al. |
| 2011/0025489 A1 | 2/2011 | Shimoda et al. |
| 2011/0074916 A1 | 3/2011 | Demirdjian |
| 2011/0103650 A1 | 5/2011 | Cheng et al. |
| 2011/0286544 A1 * | 11/2011 | Avudainayagam ... H04L 1/0009 375/295 |
| 2012/0044066 A1 | 2/2012 | Mauderer et al. |
| 2012/0062743 A1 | 3/2012 | Lynam et al. |
| 2012/0186447 A1 * | 7/2012 | Hodgson ............... F01N 3/0275 95/79 |
| 2012/0218412 A1 | 8/2012 | Dellantoni et al. |
| 2012/0262340 A1 | 10/2012 | Hassan et al. |
| 2013/0124052 A1 | 5/2013 | Hahne |
| 2013/0129150 A1 | 5/2013 | Saito |
| 2013/0131918 A1 | 5/2013 | Hahne |
| 2013/0134964 A1 * | 5/2013 | Ahrentorp ............. G01R 33/16 324/201 |
| 2013/0187445 A1 * | 7/2013 | Mutzabaugh ......... H04B 3/548 307/1 |
| 2014/0067206 A1 | 3/2014 | Pflug |
| 2014/0156157 A1 | 6/2014 | Johnson et al. |
| 2014/0160291 A1 | 6/2014 | Schaffner |
| 2014/0176711 A1 * | 6/2014 | Kirchner ............... G01B 11/00 348/148 |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

(56) References Cited

U.S. PATENT DOCUMENTS

FOREIGN PATENT DOCUMENTS

| WO | WO2010110957 | 9/2012 |
| WO | WO2013043661 | 3/2013 |
| WO | WO2013081985 | 6/2013 |

* cited by examiner

COAXIAL CABLE WITH BIDIRECTIONAL DATA TRANSMISSION

CROSS REFERENCE TO RELATED APPLICATIONS

The present application claims the filing benefits of U.S. provisional applications, Ser. No. 61/864,837, filed Aug. 12, 2013, and Ser. No. 61/833,080, filed Jun. 10, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

The present invention provides for the transfer of some or all data (such as image data captured by a camera and camera control data for use by the camera) over just one coaxial line (cable) and to eliminate the need of LIN or CAN transceivers, such as by transferring control data via at least one analog signal such as via modulation to a (sinusoidal) carrier wave, which has a frequency that is off or outside the bandwidth of the frequency of the image data FBAS (or other analog or digital image data format/encryption/modulation) signal (and decoupling/demodulating/filtering both signals at the other end of the data line). The term FBAS-signal stands for Farb-Bild-Austast-Synchron-Signal (in English, such a signal is commonly referred to as CVBS, which stands for Color, Video, Blanking, and Sync). Optionally, the present invention may also reduce the need for having a processor in the camera. Optionally, and in accordance with the present invention, DC power for powering the camera may be carried over the same coaxial line (from the ECU or image receiving device).

These and other objects, advantages, purposes and features of the present invention will become apparent upon review of the following specification in conjunction with the drawings.

LEGEND

Figure 1:
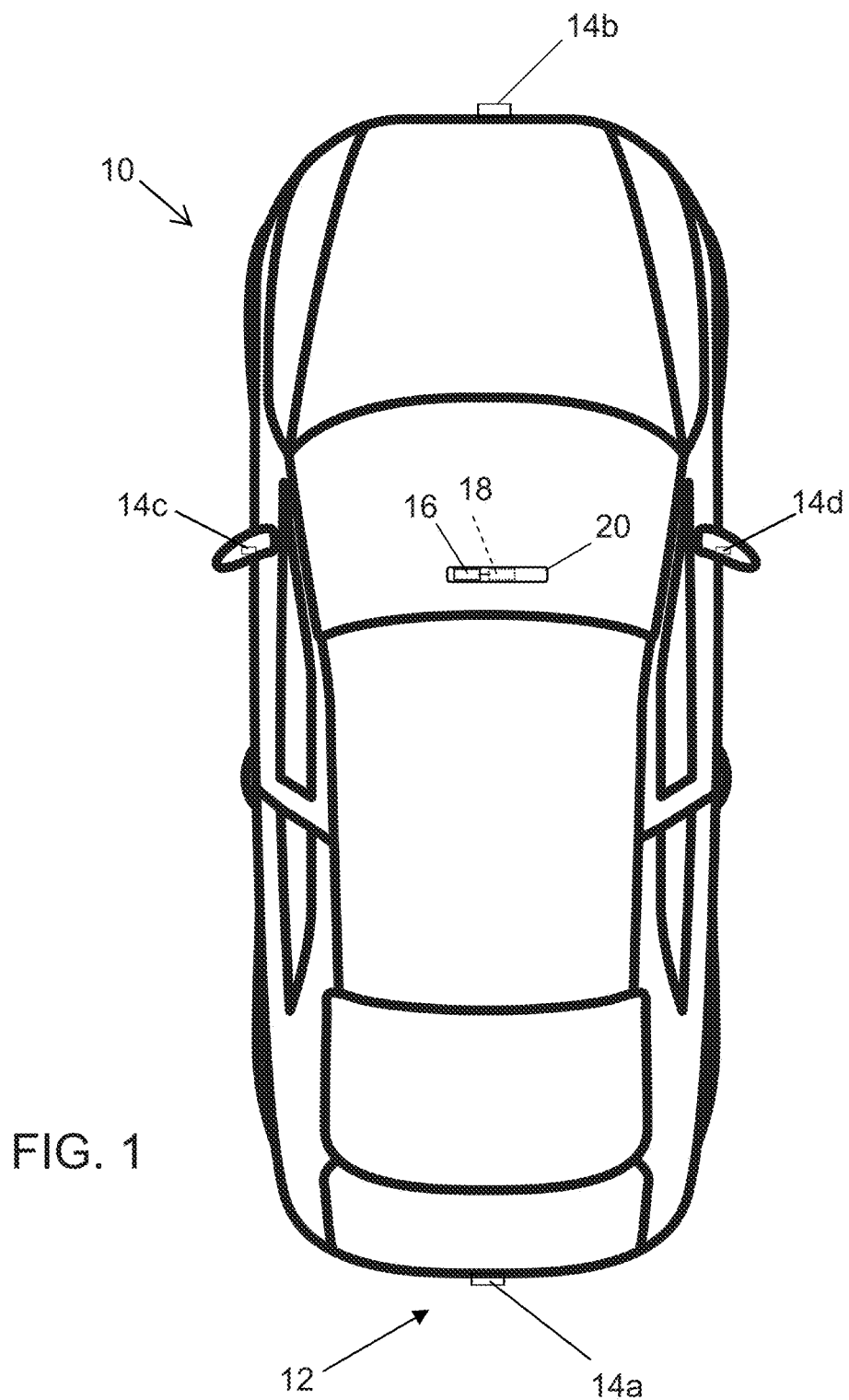
FIG. 1 is a plan view of a vehicle with a vision system that incorporates cameras in accordance with the present invention.

20 Camera device according the invention
21 Imager 22 parallel digital video (RGB)
23 I^2C data transmission
24 Analog Signal diver/receiver/modulator and encoder for FBAS signal
25 Coaxial cable line
26 Analog Signal diver/receiver/modulator/decoder and filter for FBAS signal
27 Video signal (alone), e.g., FBAS
28 bidirectional data signal (alone)
29 Image control and processing unit
30 ECU according the invention
31 Video encoder digital to analog (e.g., FBAS)
32 LIN/CAN transceiver
33 twisted pair line
34 LIN/CAN line (of any nature)
35 LIN/CAN transceiver
36 Video decoder
37 Sync detector and timing logic for camera
38 Video buffer
39 Data buffer camera
40 Known art camera device
50 ECU of known art
61 Data buffer ECU
62 Driver or modulator
63 Receiver or demodulator
64 Mixer or modulator
65 Filter or demodulator
66 Data switch
67 Switch timing signal
70 Video modulator, e.g., frequency adder camera side
71 Data demodulator camera side
72 Data demodulator ECU side
73 High pass filter
74 Band pass filter
75 Low pass filter
76 Video demodulator ECU side
77 Data modulator camera side
78 Data modulator ECU side
79 (highest) HF signal source or generator
80 (medium high) HF signal source or generator
81 (lowest) LF signal source or generator
82 Camera supply DC power source ECU side
83 Camera supply DC power node camera side
84 AC/DC filter
85 Camera data (e.g., intrinsic parameter)
86 Camera control data (e.g., white balance)
90 Camera supply AC power source ECU side
91 Camera supply AC power node camera side
92 Camera supply DC power node camera side
93 High pass filter
94 Band pass filter—high
95 Band pass filter—low
96 Shottky diode
210 Imager with on chip μC

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, known art analog automotive vision system cameras, particularly rear and surround view cameras, have no bidirectional data transmission lines and are typically mono-directional. Typically, such mono-directional camera systems use a twisted pair cable to transfer an analog signal of the cameras, such as images captured by the camera's imager to an ECU or image receiving device. A typically used signal format is FBAS. The power cable is typically separate from the data line as another cable plugged into the camera.

International Publication Nos. WO 2013/081985 and/or WO 2013/043661, which are hereby incorporated herein by reference in their entireties, suggest use of a bidirectional digital data transmission of mono-directional camera image data and bidirectional camera parameter or calibration data over one coaxial cable via an asymmetrically (shield on ground as one node/terminal and a coaxial core as the second node/terminal) driven LVDS driver plus the camera DC-power coupled and supplied by the image receiving device.

Figure 2:
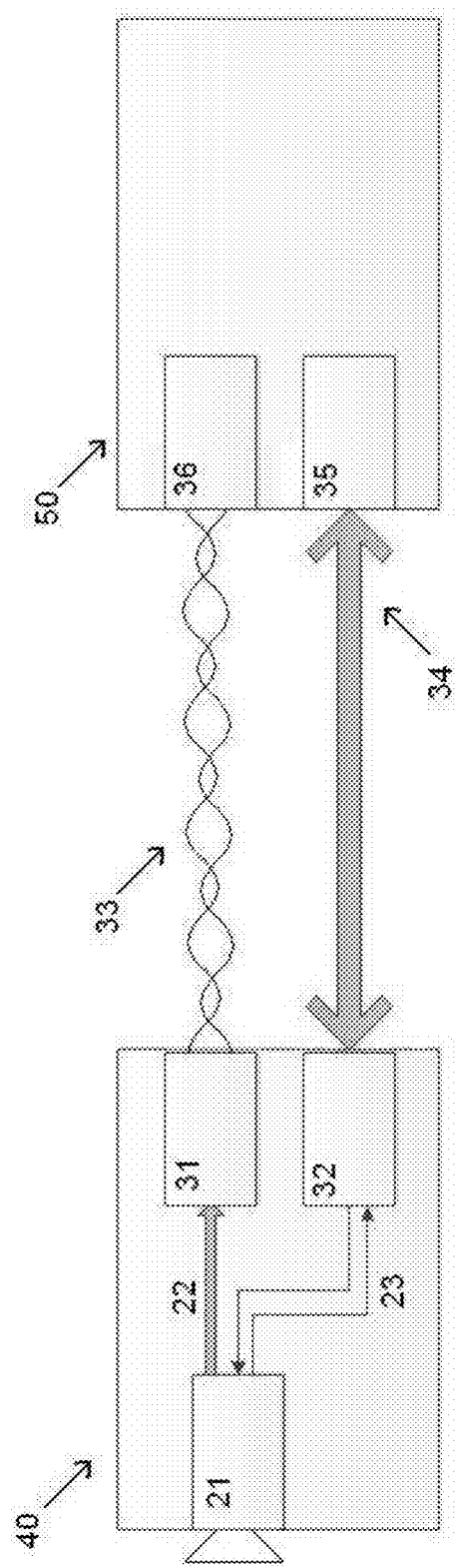
FIG. 2 is a schematic of a known LIN calibration data and FBAS image data transmission.

Relatively primitive high volume, low cost analog (especially FBAS) cameras typically cannot be controlled by an ECU since there is no back channel. Also, low cost digital cameras often have no control input or channel. When control via a back channel is desired, a LIN or CAN connection is typically the chosen bus. Twisted pair wired LVDS or Ethernet networks are also known (capable for bidirectional data transfer), such as shown in the schematic of FIG. 2. Mono-directional calibration data (to the camera or cameras) may include white balance, brightness or illumination control, pseudo synchronization, contrast enhancement, frame rate (untypically on FBAS), overlay switching, image cropping control (such as for transferring a reduced amount of image data by transferring a limited region of interest that is smaller than the full image or a limited amount of color channels of the image). When extrinsic or intrinsic parameters transfer from the camera to the ECU, a data channel from the camera to the ECU is necessary (beside the video data channel). As described in International Publication Nos. WO 2013/043661, which is hereby incorporated herein by reference in its entirety, camera parameter data parallel transmission via the video frame data stream is provided by adding the data to the video frames. Such a solution lacks suitable imagers that produce a data frame and such images tend to be too expensive due to the additional circuitry to generate data frames. Also, when using more than one camera having inter camera controls or balancing parameters, such parameters may be transmitted to and from the cameras, possibly via other nodes in between such as the ECU eventually via other nodes or gateways. Each of the ECU and the camera(s) needs to possess a twisted pair LIN/CAN/Ethernet/LVDS transceiver and a (typically small) processor for data transmission and handling accordingly. The data transfer between the imager and periphery inside the camera is typically done by I²C. The imager typically provides image data signals by parallel digital (RGB) video or FBAS (see FIG. 2). If not done via inductive coupling to LVDS via coax as described above, the camera supply is typically done via an extra cable or wire incorporated in the bunch of data wires, typically in DC.

Due to cost advantages, there is the desire to reduce the costs by reducing the number of lines, connectors and expensive components for camera image (mono-directional) and control data transfer (bidirectional) and power supply.

Figure 3:
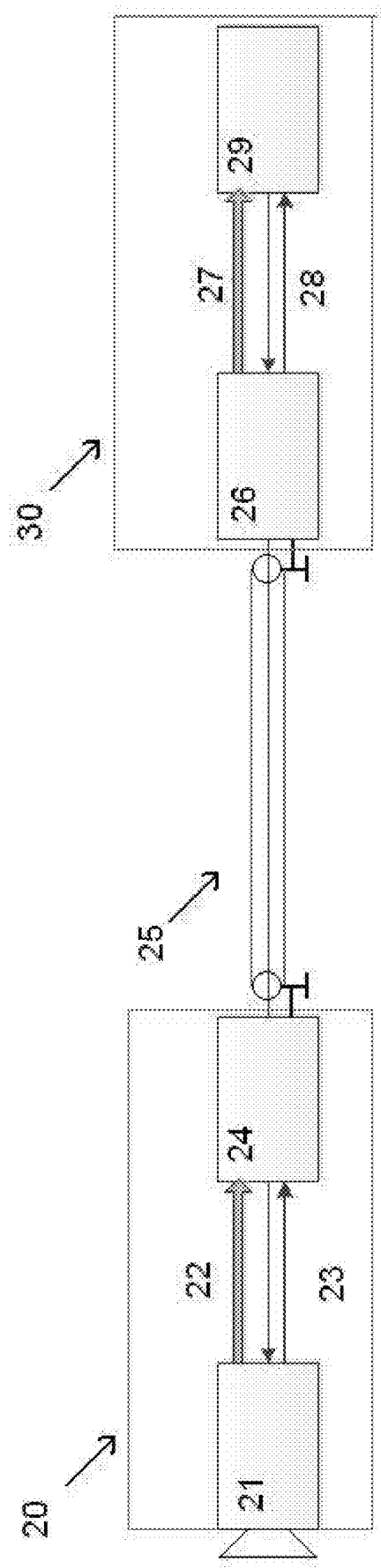
FIG. 3 is a schematic of a data transmission system and cable in accordance with the present invention.
Figure 4A:
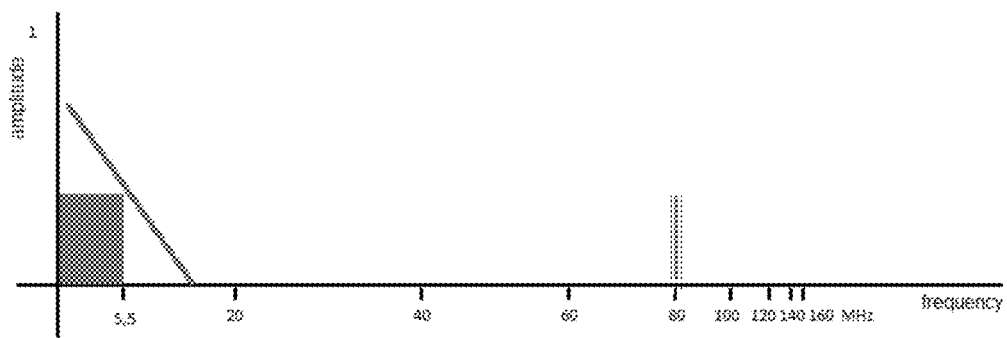
FIG. 4A is a graph of carrier frequencies that may be selected for a data channel beside the video data channel of the system of the present invention.

By transferring control data via at least one analog signal especially via modulation to a (sinusoidal) carrier wave, which has a frequency that is off or outside of the bandwidth of and with sufficient Shannon distance (or Nyquist distance) from the frequency of the image data FBAS (or other analog or digital image data format/encryption/modulation) signal (such as shown in FIG. 4A) (and decoupling/demodulating/filtering both signals at the other end of the data line), the present invention may transfer all data over just one coaxial line (cable) and may eliminate the need of LIN or CAN transceivers (see FIG. 3). The side bands of a carrier signal due to the signal modulation (the widths of the data bandwidths) must have a suitable distance to be filtered from one another. Otherwise, the Shannon-Nyquist criteria is infringed or in other words the (minimal) Shannon-Nyquist distance wasn't reflected when choosing the carriers. A greater distance is preferred when using relatively simple filters. Because the coaxial cable 'Ether' is generally empty beside the camera control signals and image data signals and power signals, the system of the present invention can use large distances between the frequencies, so long as the system has the carrier base waves generated for such signals and distances.

Depending on the further circuits and imager interfaces, the present invention may optionally also reduce the need for having a processor in the camera (maybe just using an ASIC). As another option, the present invention may transfer the DC power for the camera as well over the same coaxial line (see FIGS. 7A and 8A) (from the ECU or image receiving device) such as similar to the DC power via coaxial cable coupling/decoupling solution described in International Publication No. WO 2013/043661, incorporated above. Shown in there as positive node the core wire may be used and as negative node the coaxial cable's shielding. As an additional aspect of the invention, a coaxial cable with two shielding layers and one core wire may be used instead. Optionally, the DC may be supplied via both shield layers. Optionally, and desirably, the negative layer or ground layer may be the inner shielding layer and the positive node may be applied to the outer shielding layer for better signal annuity. The positive node may be capacitively set to the signal ground as well for conserving the double shielding effect for the signal (but not grounding the positive node in DC). By that optional configuration the DC coupling impedances may be saved.

Figure 7A:
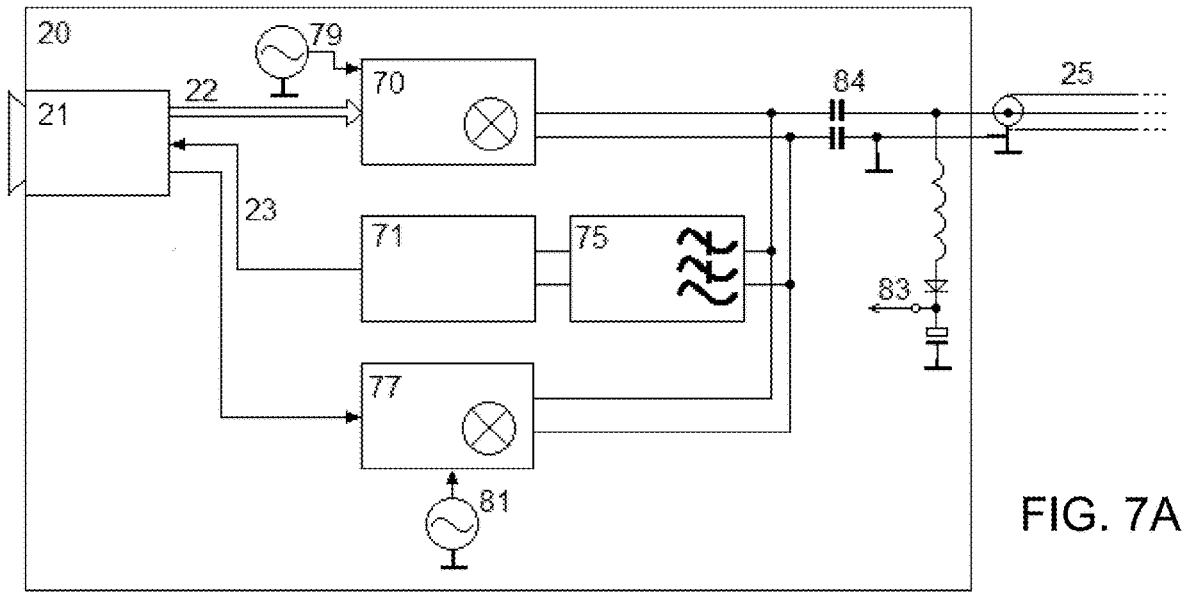
FIGS. 7A and 8A are schematics of imaging systems of the present invention transmitting both the video data of the camera and bidirectional (parameter and control) data modulated each on different carrier waves (see FIG. 4D), with a circuit shown for transmitting DC supply current from the ECU to the camera.
Figure 8A:
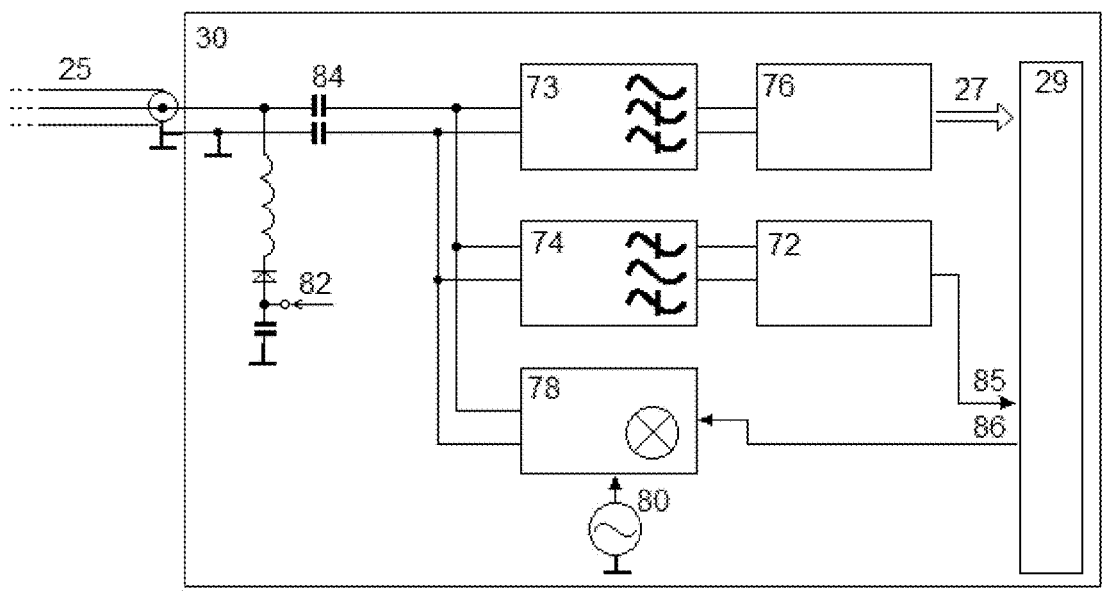
Figure 7B:
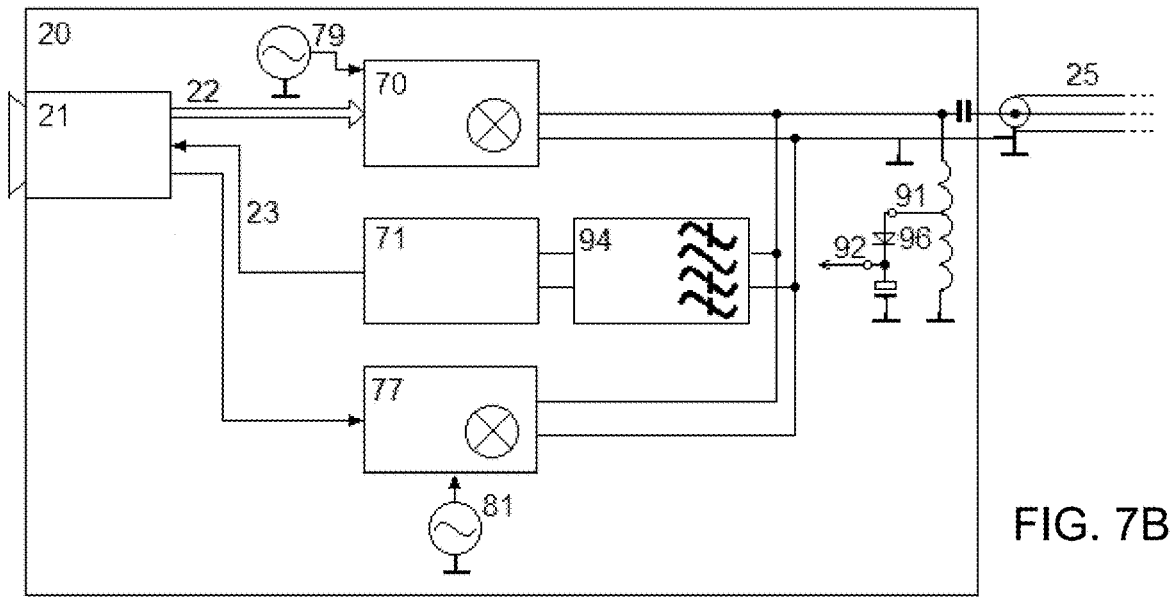
FIGS. 7B and 8B are schematics of imaging systems of the present invention transmitting both the video data of the camera and bidirectional (parameter and control) data modulated each on different carrier waves, with a circuit shown for transmitting AC supply current from the ECU to the camera (in accordance with a frequency spectrum such as shown in FIG. 4E)
Figure 8B:
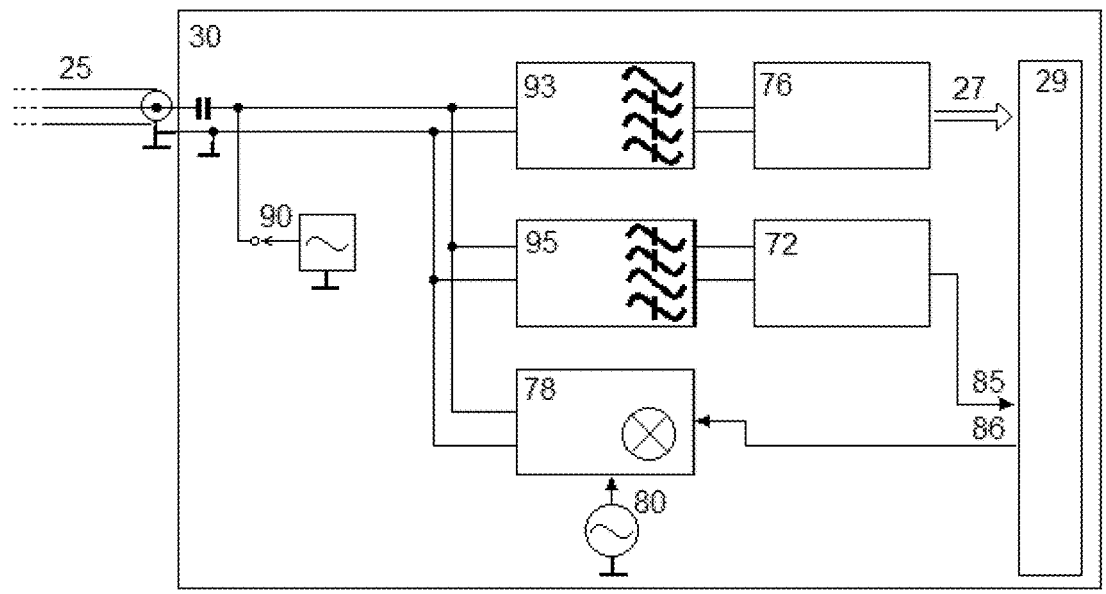

As an alternative optional solution, the camera supply may be achieved by transmitting the supply power not as DC but as alternating current (AC) via a mono or multiple shield coaxial cable, such as shown in FIGS. 7B and 8B. Optionally, the AC supply may be used as carrier wave. The video or control data may be modulated onto that carrier. Optionally, both may be modulated to the carrier. That may reduce the necessarily to generate a different carrier frequency than the supply AC frequency. Optionally, the video and control date may be modulated to different frequencies than the supply AC's frequency having sufficient Shannon distance to it and each other such as shown in the spectrum diagram of FIG. 4E and the circuits in FIGS. 7A, 8A, 7B and 8B. These figures show HF sources for delivering the carrier waves to the modulators. These may be generated separately or may be sourced by the imager frequency. Typically, there are divisions and multiples of the imager frequency present on the camera circuit board anyway.

For AC power transmission via a coaxial cable, the most primitive circuit at power consumer side (the camera side) may be set up by just one impedance, a diode and a capacitor. In FIG. 7B, an exemplary circuit is shown. The diode cuts the bottom of the AC supply wave, the capacitor on node 92 is for providing power during the negative signal half wave. Optionally, the coil may have multiple voltage taps when the consumer side system (camera system) requires more than one source voltage. Optionally, more voltage smoothing measures may be comprised in the consecutive circuits to smooth the voltage more when required. For making the consumer side capable to send data, the most primitive solution may be to substantially shortcut both nodes of the inductivity in short duration. This will equate to a primitive amplitude modulation with the short cut change pattern as its base frequency (selected in a Shannon distance to the AC supply frequency and other signal carrier frequencies).

Figure 12:
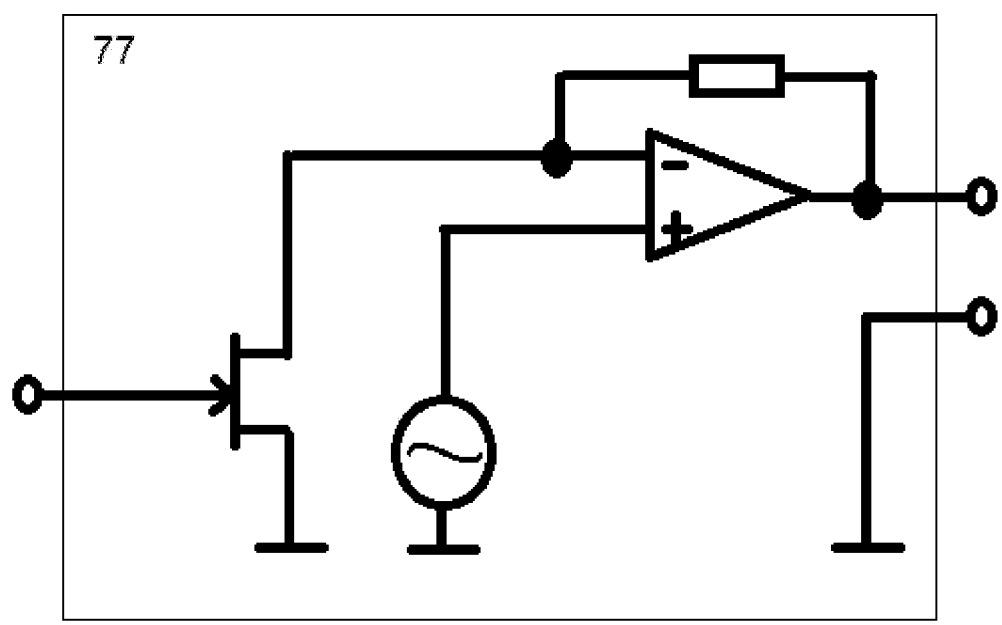
FIG. 12 is a basic driver circuit which may be used as a modulator block for the circuits of FIGS. 7A and 7B.

FIG. 12 shows a basic driver circuit which may be used as the modulator block 77 in FIGS. 7A and 7B. The digital input switches the carrier to the output on and off. This will equate to an amplitude modulation with the signal frequency as side band distance to the supplied carrier frequency 81.

Figure 9:
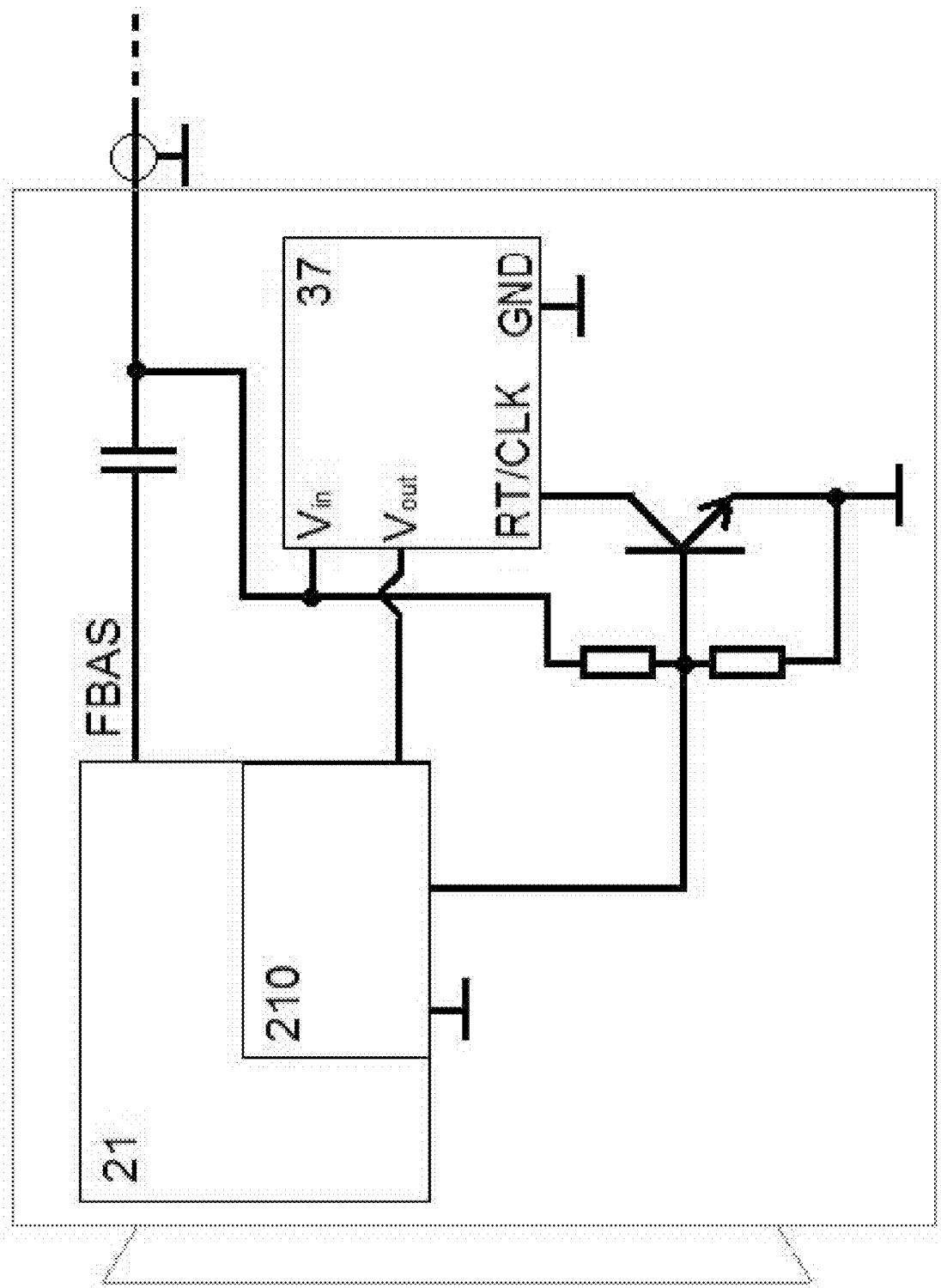
FIG. 9 is a schematized circuit diagram of how a camera inherent power converter can be used as an amplitude modulator for sending camera data (mono-directional)
Figure 10:
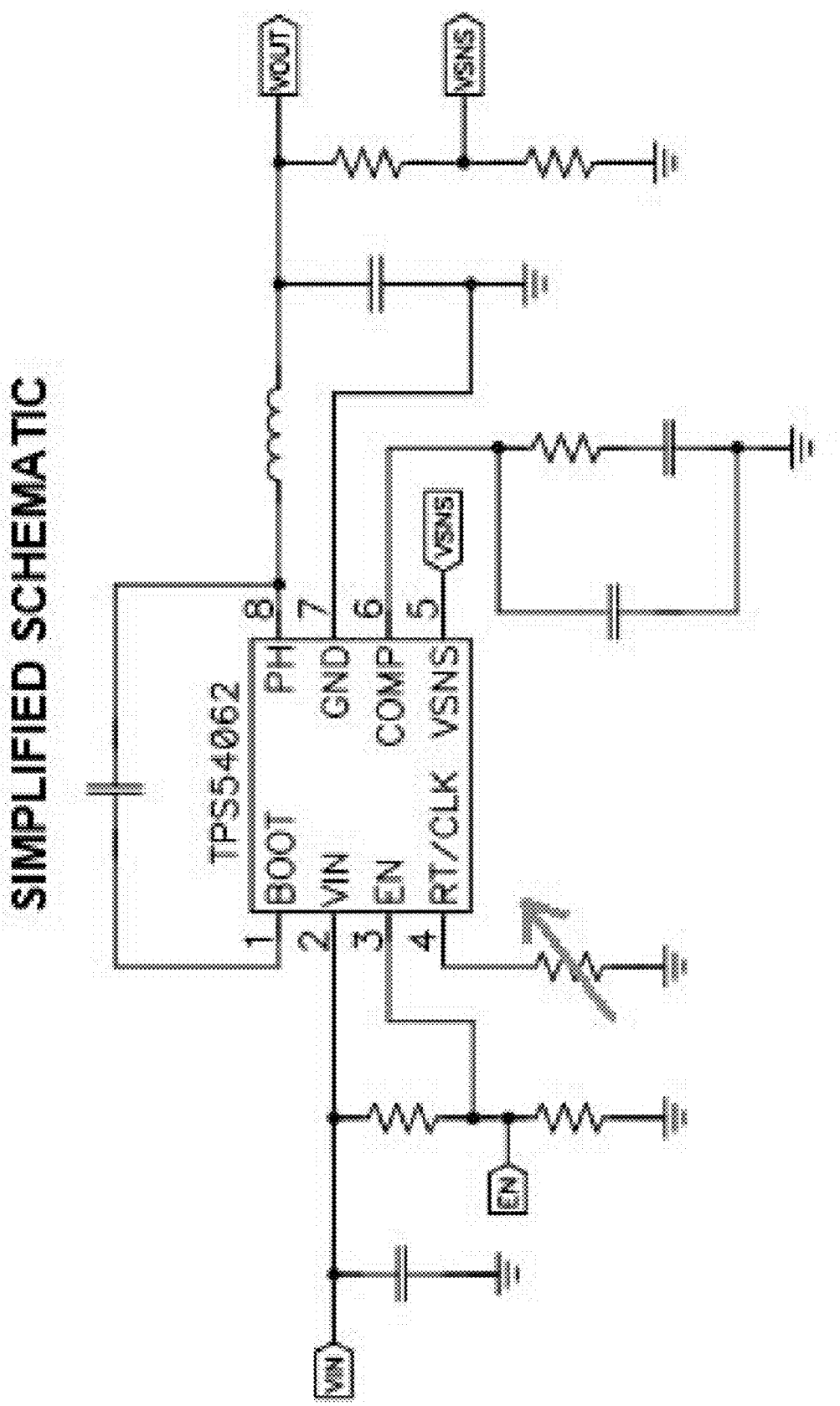
FIG. 10 is a simplified schematic of a TPS54062, which may be used as power converter in the schematized circuit diagram of FIG. 9.
Figure 11:
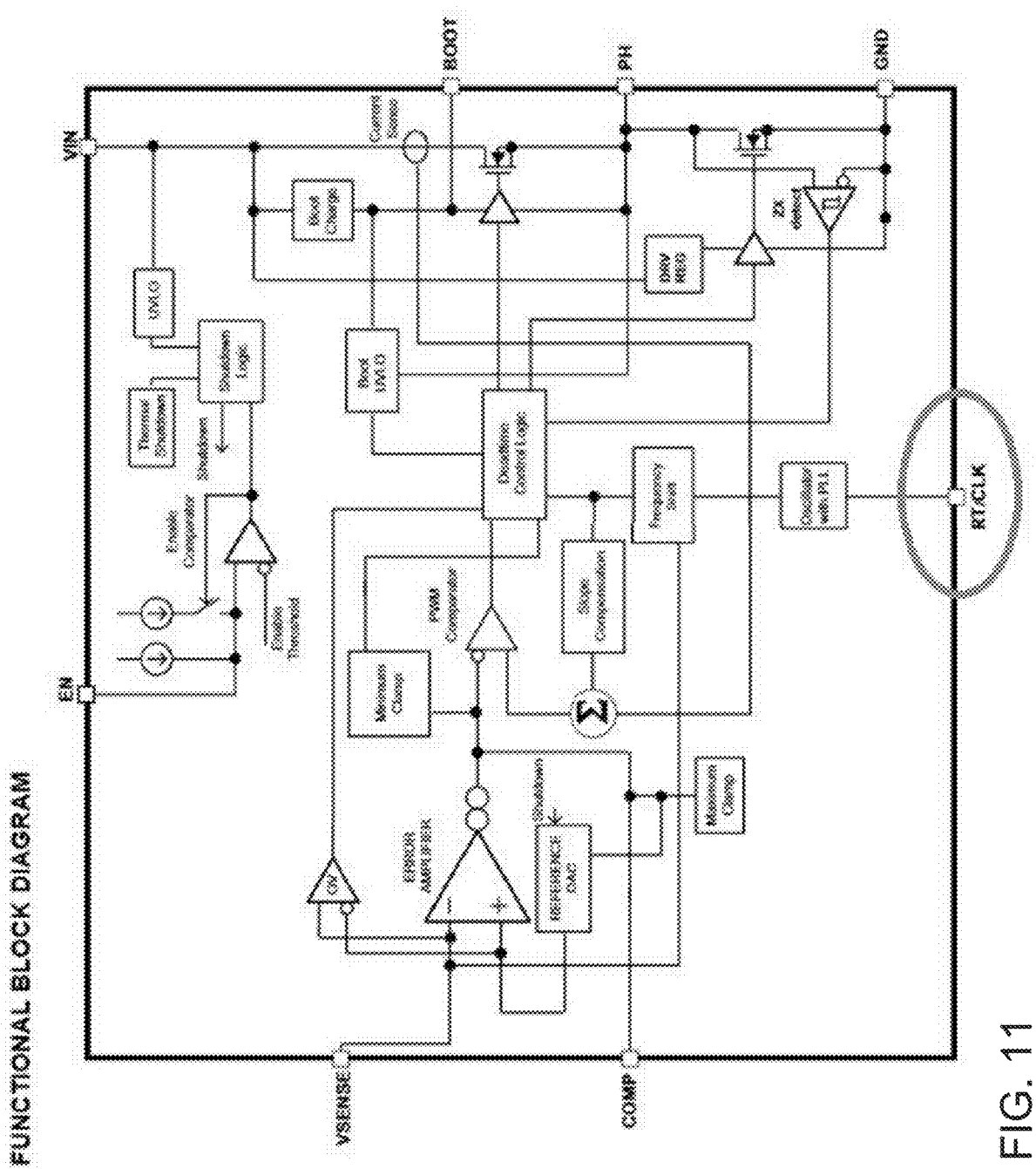
FIG. 11 is a functional block diagram of a TPS54062, which may be used as power converter in the schematized circuit diagram of FIG. 9.

In FIGS. 9-11 the (mis-)use of a camera inherent power converter, especially a TPS54062 as active element for amplitude modulation, is shown. Such a circuit allows to have an AM modulator without adding many components to the camera PCB. When a digital parameter data signal is put to the RT/CIK pin (via a small transistor as a driver), the input current of the converter rises and falls in the manner of the signal. Such a signal is detectable at the ECU side.

With both ways of having the supply power DC transmitted via inductive decoupling from the data signals or having the supply power transmitted AC as another frequency, as discussed above, the control data will be modulated to a carrier, and this may happen fully analog or partially analog, partially digital.

As an example, but not exclusively limiting AM (amplitude modulation), FM (frequency modulation), PSM (phase shift modulation), space and time modulation, QAM (quadrature amplitude modulation) or any combination thereof such as APSK (asymmetric phase-shift keying) may be the modulation methods of choice. A FM may be done by using a frequency adder. A simple adder comprises at least one non-linear component such as a diode or the like. Analog modulation methods are well studied. The most common solutions are available in several modifications in integrated circuits. The complexity and costs are mostly set by the desired signal quality especially the filter quality. The sharper the filter edges (in the frequency domain), the more costly these are.

Alternatively, another amplitude modulation (AM) may come into use. For example, and with reference to FIGS. 9-11, by switching a steady single (carrier) frequency from and to the data line on which the FBAS (or other analog or digital image data format/encryption/modulation) is already running, just this frequency and its switching harmonics will appear (such as disturbance to the FBAS or other analog or digital image data format/encryption/modulation) additionally. By (band-) filtering the carrier wave on the FBAS (or other analog or digital image data format/encryption/modulation) receiving side (ECU or other image data receiving device), the further image processing stages can be kept as usual.

Figure 4B:
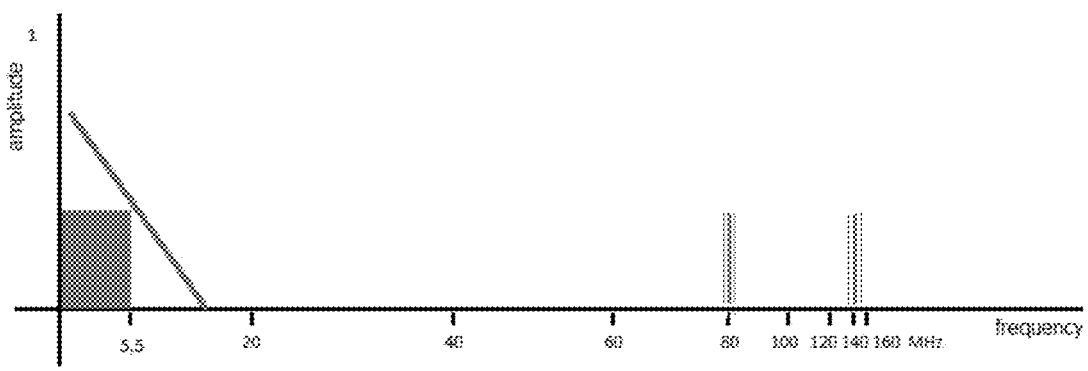
FIG. 4B is a graph of different carrier frequencies that may be selected for the camera calibration data channel, the ECU control data channel beside the video data channel of the system of the present invention.

In case it is desired that the camera also transmits data like an intrinsic parameter, feedback to control signals and the like, the camera may also have the ability (and components) to modulate its data to an analog carrier (as a second channel to the image data into the ECU's or other image receiving device's direction) as well. This carrier may be identical to (such as shown in the spectrum of FIG. 4A) or different from the carrier used by the sending unit at the ECU side (such as shown in the spectrum of FIG. 4B). When using identical carriers, the back and forth data channel (non-image) may work in half duplex, and when using different carriers, a full duplex may be possible. When using different carriers, these may be chosen to have sufficient frequency distance (acc. Shannon) for no interfering to each other.

Figure 4C:
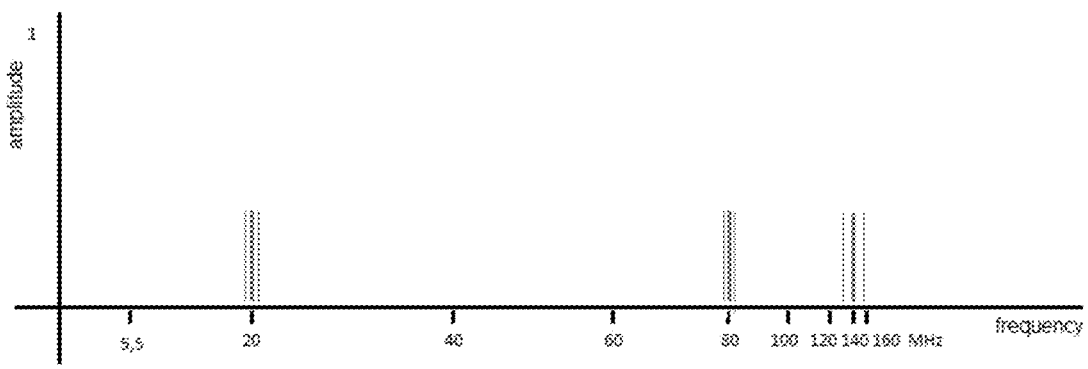
FIG. 4C is a graph of different carrier frequencies that may be selected for the camera calibration data channel, the ECU control data channel and with the video data also modulated onto a HF carrier channel of the system of the present invention.
Figure 4D:
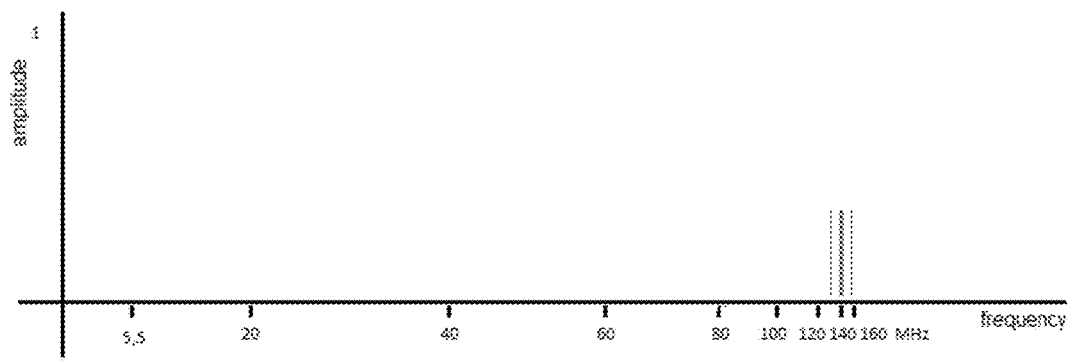
FIG. 4D is a graph of a single carrier frequency that may be selected for a common data channel of video data as well as parameter and control data of the system of the present invention.
Figure 4E:
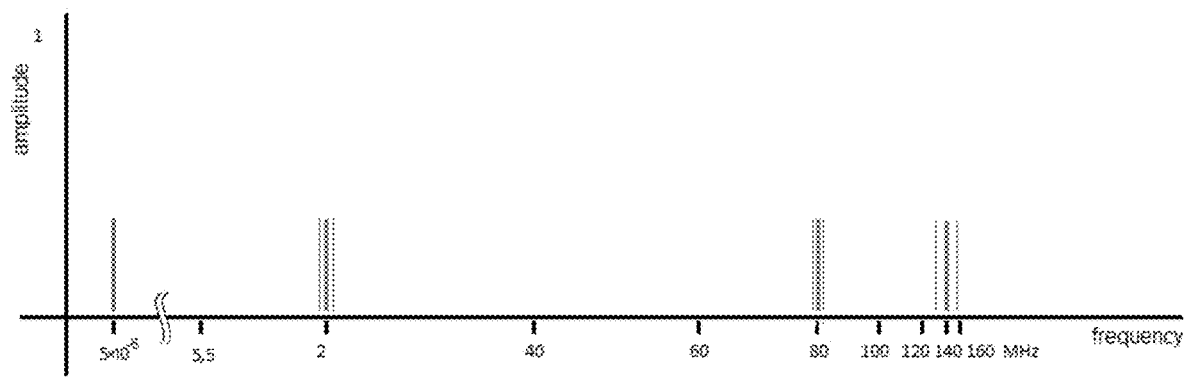
FIG. 4E is a graph of the system of the present invention showing different MHz carrier frequencies that may be selected for the camera calibration data channel, the ECU control data channel, with the video data also modulated onto a HF carrier channel, and with an additional low frequency of the camera's AC power supply.

As another option to increase the signal robustness of the video signal, also the video signal may be modulated onto a carrier using such circuits as shown in FIGS. 7A and 8A (DC supplied) and FIGS. 7B and 8B (AC supplied). Since the data bandwidths of the video channel may be the largest one, the chosen carrier frequency may preferably be higher (at an adequate Shannon distance) as the control and calibration data carrier or carriers (preferably three carriers: calibration/response data from camera to ECU; control/initialization data from ECU to camera; and video data from camera to ECU). Optionally, additional cameras' video data, possibly from a second imager in the same camera housing or an additionally attached or connected camera, may be transmitted over the same coaxial cable. The additional video data stream may also be modulated in one of the highest frequencies. Control data channels from the ECU or gate way to the camera(s) may be arranged in HF frequencies below the video data streams. The camera calibration data may be arranged in the lowest HF frequency areas due its lowest data volume. When using DC supply in accordance with the circuits of FIGS. 7A and 8A, the LF spectrum is not present, see FIG. 4C. The chosen carrier frequencies (such as shown in FIGS. 4C and 4E) may be about 20 MHz for the camera calibration data channel with +/−1 MHz bandwidths, about 80 MHz for the ECU control data channel with +/−1 MHz bandwidths and about 140 MHz for the video data channel with +/−5.5 MHz bandwidths. When using this channel configuration the video channel may be modulated FM during the control and the calibration data channel may be modulated AM. This enables the use of common video recorder chip sets.

As an alternative option it may be possible to use (misuse) the typically 5 MHz sound channel as one data channel carrier since in automotive vision typically no sound transfer is required. Though the sound bandwidths is very small. Smaller than the usually LIN bandwidth (400 kHz). As an alternative when just black and white (colorless) images are to be transferred it may be possible to use (misuse) the typically 4.43361875 MHz phase shift in which usually the color is transferred as one data channel carrier. As another aspect of the present invention, the carrier frequencies may be divider frequencies of the imager's quartz frequency.

Figure 5A:
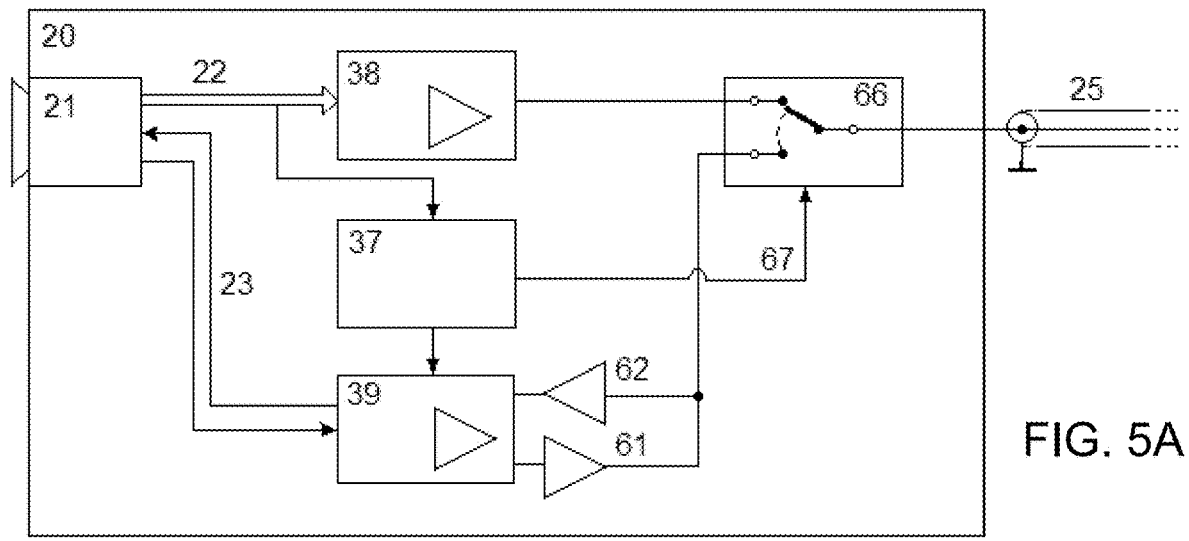
FIGS. 5A and 6A are schematics of imaging systems of the present invention transmitting the video data of the camera via (non-modulated) FBAS and bidirectional parameter and control data during the sync pause (in accordance with a frequency spectrum such as shown in FIG. 4A)
Figure 6A:
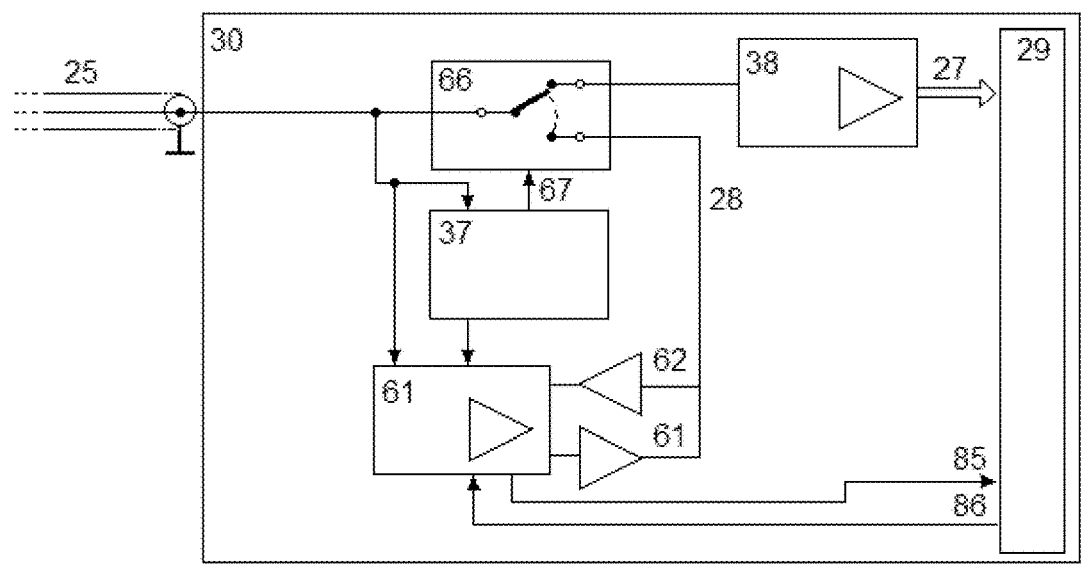
Figure 5B:
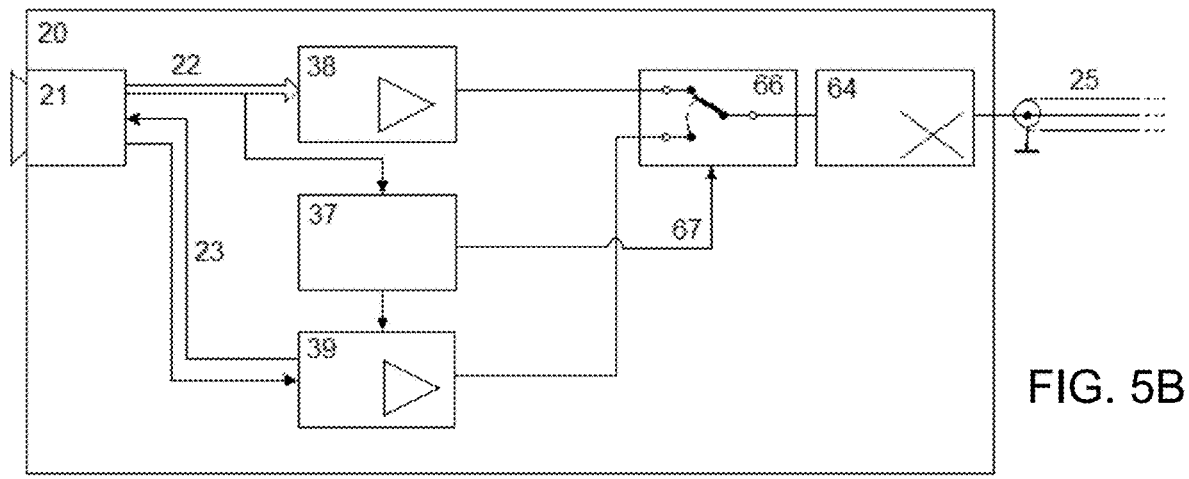
FIGS. 5B and 6B are schematics of imaging systems of the present invention transmitting the video data of the camera and bidirectional parameter and control data modulated on one (identical) carrier wave (see FIG. 4D), with the data transmitted during the sync pause.
Figure 6B:
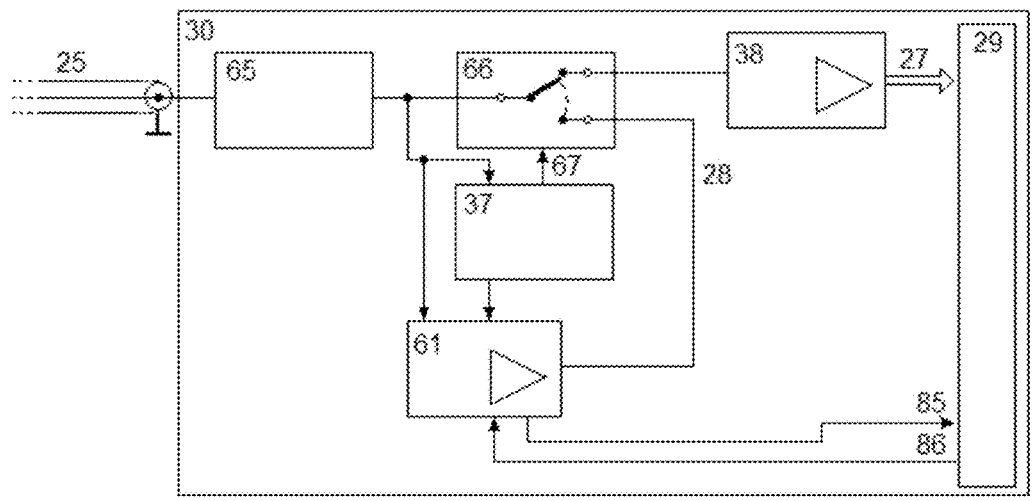

As an option for one signal channel or a shared channel by half duplex, the control and calibration data signal may be transferred during the blank interval (block diagrams or schematics of such data transmission set ups are shown in FIGS. 5A and 6A). The video signal gets transmitted unmodulated while the data signals are modulated by a pair of modulators/demodulators on each side of the coaxial cable. The according spectrum may be comparable to the one of FIG. 4A, preferably when using just one channel together with the video signal (just one carrier such as shown in the according spectrum of FIG. 4D) (block diagrams of such data transmission set ups are shown in FIGS. 5B and 6B, where the video signal gets transmitted via the identical modulator such as a frequency adder) as the data signals. The according spectrum may be comparable to the one of FIG. 4D.

Due to having just the sync pause time for parameter and calibration data transmission the possible data bandwidths is limited. The coding may be done in a Manchester code type. As an alternative, both devices may be allowed to speak or communicate or transmit in order to the video line number. In uneven lines, the ECU (or other video receiving device such as a gateway between ECU and camera) may talk to or communicate with the camera, and in even lines the camera may talk to or communicate with the ECU (or other receiving device).

As another aspect of the present invention, the receiving unit (e.g. an ECU) may use an PLL (phase lock loop) locking to a signal carrier frequency or when using AC power supply the AC frequency instead of generating it independently (on camera side). By that, frequency generating camera components such as a quartz or frequency divider circuits may be eliminatable (saving cost and space and reducing the lost heat). Additionally, that configuration may be used for synchronizing the camera or multiple cameras to the ECU (or other video receiving device). Optionally, the camera synchronization control (from the ECU to the camera) may use a phase shift modulation method during the calibration and control data channels (from the camera to ECU or other video receiving device) using amplitude modulation for data transmission.

When using a camera synchronization which is switching the cameras between two modes such as described in U.S. patent application Ser. No. 14/097,581, filed Dec. 5, 2013, which is hereby incorporated herein by reference in its entirety, the two modes may be switched by two phase shift pattern. Optionally, the active component of the camera voltage control (which may be AC or DC) may not be on the camera but at the sourcing (the ECU) side. Via the analog control channel, the camera may transmit a command or continuous control to the ECU voltage source control. The voltage may be raised or lowered on the ECU based on the camera's (requested) control signal. The control signal may be a PWM. The signal may be merged or incorporated with other control signals such as the I^2C.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248,602, filed Apr. 9, 2014; Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940, filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. No. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; and/or Ser. No. 61/823,644, filed May 15, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308, 341; 7,289,037; 7,249,860; 7,004,593; 4,546,551; 5,699, 044; 4,953,305; 5,576,687; 5,632,092; 5,677,851; 5,708, 410; 5,737,226; 5,802,727; 5,878,370; 6,087,953; 6,173, 508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581, 859; 7,446,650; 7,370,983; 7,338,177; 7,274,501; 7,255, 451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255, 451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera disposed at a vehicle equipped with said vision system, wherein said camera, when disposed at the vehicle, has a field of view exterior of the vehicle, said camera capturing image data;
   a control comprising an image processor;
   a single coaxial cable connecting said camera with said control;
   wherein said single coaxial cable comprises a single core wire, an inner shielding layer and an outer shielding layer;
   wherein said inner shielding layer circumscribes said single core wire and said outer shielding layer circumscribes said inner shielding layer, and wherein said outer shielding layer is electrically isolated from said inner shielding layer and said inner shielding layer is electrically isolated from said single core wire;
   wherein said single coaxial cable carries (i) image data from said camera to said control, (ii) camera control data from said control to said camera and (iii) electrical voltage for powering said camera;
   wherein said image processor is operable to process image data captured by said camera and carried to said control via said single coaxial cable;
   wherein electrical voltage for powering said camera is carried by said inner and outer shielding layers, and wherein one of said inner and outer shielding layers is electrically connected to negative voltage or ground and the other of said inner and outer shielding layers is electrically connected to positive voltage;
   wherein said control receiving image data carried thereto via said single coaxial cable comprises a phase lock loop locking to a signal carrier frequency carried by said single coaxial cable; and
   wherein said camera is part of a plurality of cameras, and wherein respective coaxial cables connect said cameras with said control, and wherein said plurality of cameras and said control are part of a multi-camera surround view vision system of the vehicle.

2. The vision system of claim 1, wherein said vision system is operable to carry camera control data via modulation of a carrier wave of at least one analog signal on said single coaxial cable.

3. The vision system of claim 2, wherein said carrier wave has a frequency that is outside the bandwidth of signals carrying image data.

4. The vision system of claim 1, wherein said electrical voltage comprises a direct current electrical voltage.

5. The vision system of claim 1, wherein said electrical voltage comprises an alternating current electrical voltage.

6. The vision system of claim 1, wherein camera control data is carried on said single coaxial cable by a signal having a frequency outside of the bandwidth of signals carrying image data on said single coaxial cable.

7. The vision system of claim 6, wherein camera control data carried on said single coaxial cable has a frequency that has a sufficient Shannon distance from a frequency of signals carrying image data on said single coaxial cable.

8. The vision system of claim 1, wherein said single coaxial cable carries calibration and response data from said camera to said control.

9. The vision system of claim 1, wherein camera control data carried on said single coaxial cable from said control to said camera comprises initialization data.

10. A vision system for a vehicle, said vision system comprising:
   a plurality of cameras disposed at a vehicle equipped with said vision system, wherein each of said cameras, when disposed at the vehicle, has a respective field of view exterior of the vehicle, said cameras capturing image data;
   a control comprising an image processor;
   wherein said plurality of cameras and said control are part of a multi-camera surround view vision system of the vehicle;
   a plurality of coaxial cables, each connecting a respective one of said cameras with said control;
   wherein each of said coaxial cables comprises a single core wire, an inner shielding layer and an outer shielding layer;
   wherein said inner shielding layer circumscribes said single core wire and said outer shielding layer circumscribes said inner shielding layer, and wherein said outer shielding layer is electrically isolated from said inner shielding layer and said inner shielding layer is electrically isolated from said single core wire;
   wherein each of said coaxial cables carries (i) image data from the respective camera to said control, (ii) camera control data from said control to the respective camera and (iii) electrical voltage for powering the respective camera;
   wherein said image processor is operable to process image data captured by said cameras and carried to said control via said coaxial cables;
   wherein electrical voltage for powering each of said cameras is carried by said inner and outer shielding layers of a respective one of said coaxial cables, and wherein one of said inner and outer shielding layers of the respective coaxial cable is electrically connected to negative voltage or ground and the other of said inner and outer shielding layers of the respective coaxial cable is electrically connected to positive voltage; and
   wherein said control receiving image data carried thereto via said coaxial cables comprises a phase lock loop locking to a signal carrier frequency carried by at least some of said coaxial cables.

11. The vision system of claim 10, wherein said vision system is operable to carry camera control data via modulation of a carrier wave of at least one analog signal.

12. The vision system of claim 11, wherein said carrier wave has a frequency that is outside the bandwidth of signals carrying image data on a respective one of said coaxial cables.

13. The vision system of claim 10, wherein said electrical voltage comprises a direct current electrical voltage.

14. The vision system of claim 10, wherein said electrical voltage comprises an alternating current electrical voltage.

15. The vision system of claim 10, wherein camera control data is carried by a signal having a frequency outside of the bandwidth of signals carrying image data on a respective one of said coaxial cables.

16. A vision system for a vehicle, said vision system comprising:
   a plurality of cameras disposed at a vehicle equipped with said vision system, wherein each of said cameras, when disposed at the vehicle, has a respective field of view exterior of the vehicle, said cameras capturing image data;
   a control comprising an image processor;
   wherein said plurality of cameras and said control are part of a multi-camera surround view vision system of the vehicle;
   a plurality of coaxial cables, each connecting a respective one of said cameras with said control;
   wherein at least some of said coaxial cables comprise a single core wire, an inner shielding layer and an outer shielding layer;
   wherein said inner shielding layer circumscribes said single core wire and said outer shielding layer circumscribes said inner shielding layer, and wherein said outer shielding layer is electrically isolated from said inner shielding layer and said inner shielding layer is electrically isolated from said single core wire;
   wherein said at least some of said coaxial cables carry (i) image data from the respective camera to said control, (ii) camera control data from said control to the respective camera and (iii) electrical voltage for powering the respective camera;
   wherein camera control data is carried by a signal having a frequency outside of the bandwidth of signals carrying image data on a respective one of said at least some of said coaxial cables;
   wherein said image processor is operable to process image data captured by said cameras;
   wherein electrical voltage for powering a respective one of said cameras is carried by said inner and outer shielding layers of a respective one of said at least some of said coaxial cables, and wherein one of said inner and outer shielding layers of the respective coaxial cable is electrically connected to negative voltage or ground and the other of said inner and outer shielding layers of the respective coaxial cable is electrically connected to positive voltage; and
   wherein said control receiving image data carried thereto via said coaxial cables comprises a phase lock loop locking to a signal carrier frequency carried by at least some of said coaxial cables.

17. The vision system of claim 16, wherein said vision system is operable to carry camera control data via modulation of a carrier wave of at least one analog signal, and wherein said carrier wave has a frequency that is outside the bandwidth of signals carrying image data on a respective one of said at least some of said coaxial cables.

18. The vision system of claim 16, wherein said electrical voltage comprises an alternating current electrical voltage.

\* \* \* \* \*